United States Patent [19]
Cook et al.

[11] Patent Number: 6,112,300
[45] Date of Patent: *Aug. 29, 2000

[54] METHOD AND APPARATUS FOR PERFORMING MULTI-WAY BRANCHING USING A HARDWARE RELATIONAL TABLE

[75] Inventors: Thomas E. Cook, Essex Junction, Vt.; Yu-Chung C. Liao, Austin, Tex.; Peter A. Sandon, Essex Junction, Vt.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/089,973

[22] Filed: Jun. 3, 1998

[51] Int. Cl.$^7$ ........................................................ G06F 9/345
[52] U.S. Cl. ............................ 712/236; 712/235; 712/239
[58] Field of Search ..................................... 712/236, 235, 712/239

[56] References Cited

U.S. PATENT DOCUMENTS

| | | | |
|---|---|---|---|
| 4,787,035 | 11/1988 | Bourne | 364/300 |
| 5,333,283 | 7/1994 | Emma et al. | 395/375 |
| 5,434,985 | 7/1995 | Emma et al. | 395/375 |
| 5,442,760 | 8/1995 | Rustad et al. | 395/391 |
| 5,586,330 | 12/1996 | Knudsen et al. | 395/705 |
| 5,872,965 | 2/1999 | Petrick | 395/583 |

*Primary Examiner*—Richard L. Ellis
*Assistant Examiner*—Gautam R Patel
*Attorney, Agent, or Firm*—Pollock Vande Sande & Amernick

[57] ABSTRACT

Multi-way branching is implemented via a single instruction by providing a computer system with a hardware token-to-address table, loading the table with branch target data correlating to the multi-way branch instruction, including software for execution with at least one multi-way branch instruction executing that branch instruction by accessing the table. The computer system is conventionally supplied with branch logic and general purpose register stack with a multi-ported output interface. The hardware resource added implementing the multi-way branch operation includes the table in the form of addressable storage comprising a plurality of multi-byte locations with a write data input and a read data output. A decoder is connected between one port of the general purpose register interface with an output to select one of the multi-byte locations for an input or output operation. The write data input of the addressable storage or table is connected to another port of the general purpose register interface. The read data output of the addressable storage is connected to the branch logic so that data may be written from a port of the general purpose registers to a location in the addressable storage determined by an associated index obtained from another port of the general purpose register and data may be selected for output from the addressable storage to the branch logic by applying an index from a port of the general purpose registers to effect a data read operation.

15 Claims, 9 Drawing Sheets

FIG.1

PRIOR ART

SAMPLE CASE STATEMENT

```
switch (x)  {
case 1: handle_case1 () ;   //call routine to handle case when x=1
     break;
case 2: handle_case2 () ;   //call routine to handle case when x=2
     break;
case 55: handle_case55 () ;  //call routine to handle case when x=55
     break;
default: handle_nomatch () ;  //call routine to handle case when
                              there is no valid match
}
```

```
load      register_1, Java_instruction_token
                      #Token is an integer
multiply  register_1,4   #Multiplying token by 4 makes
                      #  it an index into a
                      #  token/subroutine relation
                      #  table load register_2, token_subsroutine_table_basefffregister_1
                      #Load the target subroutine
                      #  from the token/subroutine
                      #  relation table using the
                      #  token as an index into the
                      #  table branch    register_2    #Jump to the target subroutine
                      #  to process the Java instruction
```

FIG.2A

```
load      register_0, Java_instruction_token
                      #Token is an integer bttat                 #Branch on token subroutine
                      #  token is assumed to be in
                      #  register 0
```

FIG.2B

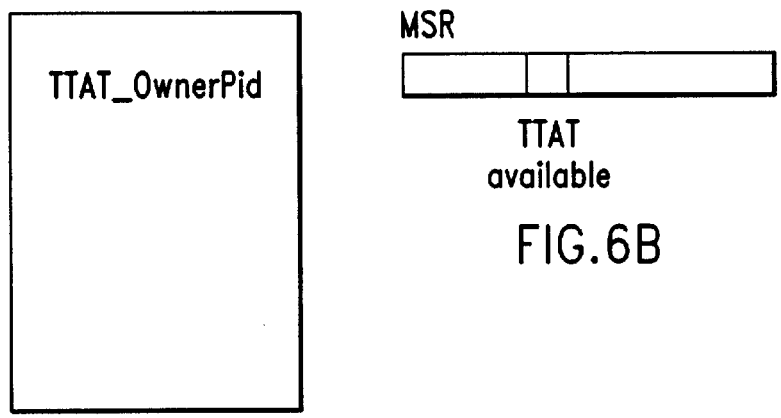
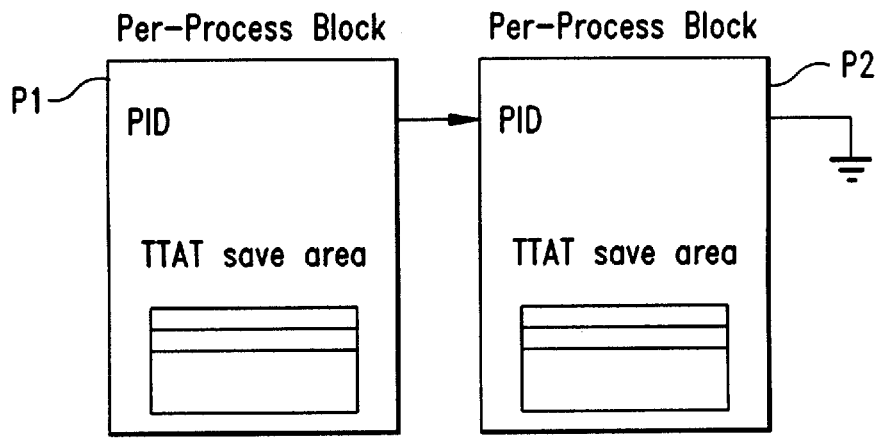
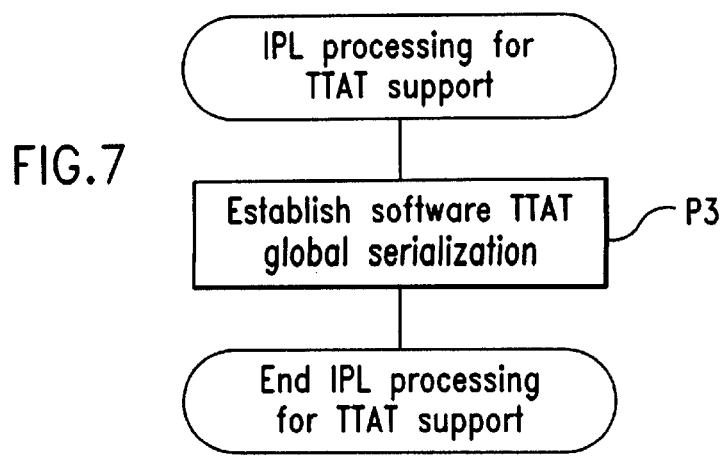

METHOD AND APPARATUS FOR PERFORMING MULTI-WAY BRANCHING USING A HARDWARE RELATIONAL TABLE

TECHNICAL FIELD

The present invention relates to improvements in computer operation and more particularly providing for efficient multi-way branching.

BACKGROUND OF INVENTION

Computers represent a well developed body of art. Many computers include both a processor and associated memory. The memory is used to store software. In many cases, the software stored in memory includes an operating system and one or more applications. In normal operation, the applications are supported by both the processor as well as the operating system.

The C language is similar to many other computer languages in that those languages provide for instructions which implement a selection from among a group based on the test of a single value. As an example, FIG. 1 illustrates a Case statement. The Case statement is a powerful programming tool and is often used in programs designed to decode a stream of data. A program that parses text into tokens such as a compiler may use a Case statement. A program that simulates a computer architecture may use a Case statement to decode machine instructions and dispatch subroutines to carry out the instruction operations. FIG. 1 is an example of the use of several Case statements. Based on the value of the parameter x, the statements allow a selection as well as a default selection in the event that the parameter x does not match any of the predetermined selections.

While the Case statement and similar instructions in other languages are powerful tools, they exhibit poor performance (relative to other less powerful statements). Case statements do not translate well from a high level language to machine language.

An efficient translation of a Case statement involves converting the parameter, or target item x, into a token and then matching that token (derived from the parameter x) to a token/subroutine relation pair. A typical example is the problem presented when decoding Java (TM) instructions. There are 256 possible Java instructions. The Java instruction is converted into a parameter like the parameter x, hereinafter referred to as a token. Since there are 256 Java instructions, there are 256 subroutines in the Java interpreter, each with a task of processing the action of a Java instruction. The token/subroutine matching involves matching the Java instruction token x to the subroutine responsible for processing that instruction.

The token/subroutine pair is normally expressed in a table of addresses indexed by the token derived from the parameter x. Therefore, the operation of the Case statement in an abstract machine language would take on the form of the four statements shown in FIG. 2A. As shown in FIG. 2A, the first statement, the load statement, loads the register 1 with a Java instruction token (i.e. the parameter x). The second statement processes the token to make it into an index (in this case multiplying it by 4 to account for 4-byte wide addresses). The next statement uses the result produced in the multiply statement as an index into a table to extract the corresponding target subroutine address. In the third statement, this address is then loaded into register 2 so that the following statement, the branch, allows a jump to the target subroutine for processing the Java instruction.

The actual assembler operation specifics will vary from machine to machine but the basic operation does not change.

For example, the PowerPC instruction set requires five instructions to perform this Case operation. The x86 instruction set requires three instructions. However, every modern processor architecture suffers from a pipeline stall during this particular translation. Thus, the present invention would improve performance of PowerPC (or RISC processors), X86 descendant processors, and the newly developing JAVA processors. The stall is due to the well known "computed goto" nature of the Case statement. Until the branch operation is implemented (in the fourth statement of FIG. 2A), the processor is unaware of the destination and therefore must stall until that address is available. The address does not become available until late in the operation sequence.

To provide a solution to the problem, the present invention is directed at providing an inexpensive and simple multi-way branch instruction. While the problem presented by interpreting or decoding Java instructions has been presented, the solution which will be described is applicable to similar, traditionally poor performing operations. Any computing operation that takes a token and must branch to a unique location based on the token will benefit. Aside from the Java example noted above, other similar operations include:

1. Parsing operations such as word processors and network switching.
2. Simulators such as Apple's highly used 68000 emulator with a PowerPC.

SUMMARY OF INVENTION

The invention solves the foregoing problem through the use of novel software and hardware.

The novel hardware includes a storage area referred to as a token-to-address table (TTAT) which is used along with the software to simplify execution of a multi-way branch instruction. With respect to one aspect, the invention provides a method for efficiently operating a computer system including at least one multi-way branch instruction comprising the steps of:

providing a computer system with a hardware token-to-address table (TTAT),
   providing software for execution with at least one multi-way branch instruction,
   loading the TTAT with branch target data correlating to the multi-way branch instruction, and
   executing the software including accessing the TTAT to execute the multi-way branch instruction.

Preparatory to actually executing the multi-way branch instruction, ancillary software provides for loading the storage area or TTAT. The TTAT is loaded with address data, each address correlating with the memory location of a particular instruction, an address is loaded in a location in the TTAT corresponding to the associated index.

Accordingly, when the software is executed, the index (or token) which is extracted points directly to a location in the TTAT so that the associated address can be extracted in a single operation.

In accordance with another aspect, the invention comprises a program product for efficiently providing multi-way branches comprising:

a computer usable medium and computer readable program code means embodied in said medium including at least one multi-way branch statement,
   said program code means including a single statement implementing a multi-way branch by using an index to address a multi-location table storing branch target addresses.

In connection with a hardware aspect, the invention provides a hardware resource for improving multi-way branch instruction execution in a computer system having branch logic and a general purpose register stack with a multi-port output interface. The improved hardware resource for implementing efficient multi-way branch operation includes:

addressable storage comprising a plurality of multi-byte locations, said addressable storage having a write data input and a read data output, a decoder connected between one port of the general purpose register interface, said decoder having an output for selecting one of the multi-byte locations for an input/output operation, means coupling the write data input of the addressable storage to another port of the general purpose register interface, means coupling the read data output of the addressable storage to the branch logic, whereby data may be written from a port of the general purpose registers to a location in the addressable storage determined by an associated index obtained from another port of the general purpose registers, and whereby data may be selected for output from the addressable storage to the branch logic by applying an index from a port of the general purpose registers to effect a data read operation.

BRIEF DESCRIPTION OF THE DRAWINGS

The present invention will now be further described in the following portions of the specification when taken in conjunction with the attached drawings in which:

FIG. 1 shows an example of a prior art Case statements;

FIG. 2A illustrates assembly instructions for executing a Case type multi-way branch operation using prior art techniques;

FIG. 2B is an example of similar instructions using the present invention;

FIGS. 6A–6C show software data structures employed to support the use of the present invention, specifically;

FIG. 6A illustrates a global TTAT status area;

FIG. 6B illustrates the addition of a TTAT available flag to a Machine Status Register (MSR);

FIG. 6C shows per-process block storage for providing a TTAT save area;

FIG. 7 is a flow chart showing a portion of the software support for the present invention;

BEST AND VARIOUS MODES FOR CARRYING OUT INVENTION

FIG. 1 shows a typical, prior art case statement. It is an object of the invention to improve the implementation of the case statement as opposed to changing the statement.

FIG. 2A is a typical assembly language sequence which implements the typical, prior art case statement. The sequence in FIG. 2A illustrates the typical "computed goto" problem. Particularly, it is not until the third statement (the second load statement) has been completed that the branch address is available. Any pipeline sequence would have to stall until that address is available.

This problem can be contrasted with the two statement sequence of FIG. 2B which illustrates how the machine language instruction, using the principles of the present invention, may be implemented. In particular, there is only one statement (the load statement) which precedes the actual branch. In effect, this branch takes one machine language statement. In particular, the first statement loads register 0 with the token corresponding to the particular branch which is desired. The token is used as an address into a table (the token-to-address table or TTAT). It is the presence of the TTAT which allows the new instruction, identified as bttat, to be implemented. Thus, the second statement in FIG. 2B is the branch itself. The manner in which this instruction, i.e. bttat, is implemented will now be made clear.

Figure 5:
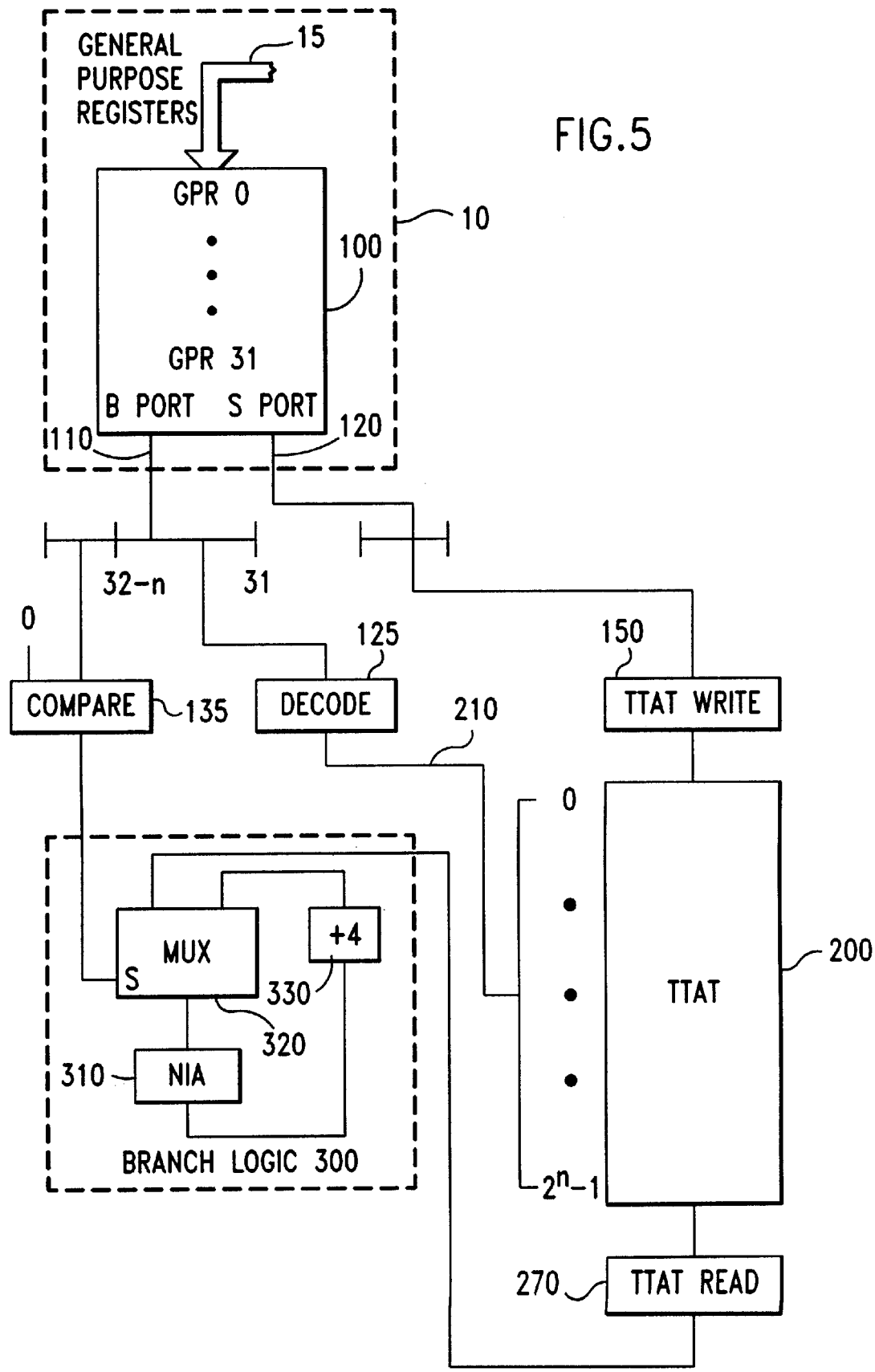
FIG. 5 illustrates the combined hardware resource for both FIGS. 3A and 4A.

FIG. 5 illustrates one example of hardware which may be added to a PowerPC microprocessor in order to implement the present invention. Shown dotted in FIG. 5 are cooperating elements of the processor which are extant in the PowerPC microprocessor including the General Purpose Registers 100 and Branch Logic 300. The General Purpose Registers 100 receive data from a bus 15 coupled to other elements of the processor. The NIA 310 makes the next instruction address available to other elements of the processor. The other elements, the elements shown outside the dotted blocks, are the hardware which is added as described. One element is addressable storage in the form of TTAT 200. The TTAT is merely multi-location addressable storage, with each location having the capacity to store the required target data such as an address. The location in which any particular piece of data is stored provides the index/target pair relationship which is needed to implement the invention. The TTAT 200 can consist of N 4-byte elements, where N is the nth power of 2. The use of 4-byte elements is merely one example of suitable capacity for the storage locations. Those skilled in the art will understand that other location capacities can be used depending on implementation requirements. In addition to the table itself, a 4-byte write register 150 is used when loading the table and a 4-byte read register 270 is used when accessing the table to obtain a branch target address. Additional logic is needed to decode the table index and to compare high-order index bits with 0 to detect an out-of-range index. A multiplexer 320 is used to select the next sequential address in the case of an out-of-range index, and otherwise to use the index table entry as the next instruction address which is loaded in the Next Instruction Address (NIA) register 310. In addition to the table 200, FIG. 5 shows a decode element 125 which is coupled between a B port 110 of the general purpose registers 100 and an addressing input 210 of the TTAT 200 and a compare element 135 also connected between the B port 110 of the general purpose registers with an output to the Select S input of multiplexer 320. The other input to the compare element 135 is coupled to a source of a digital count of 0. The TTAT write register 150 is coupled to the S port of the general purpose registers 100 via an interface 120. The reference to B and S ports is arbitrary, as will become clear hereinafter.

Figure 4A:
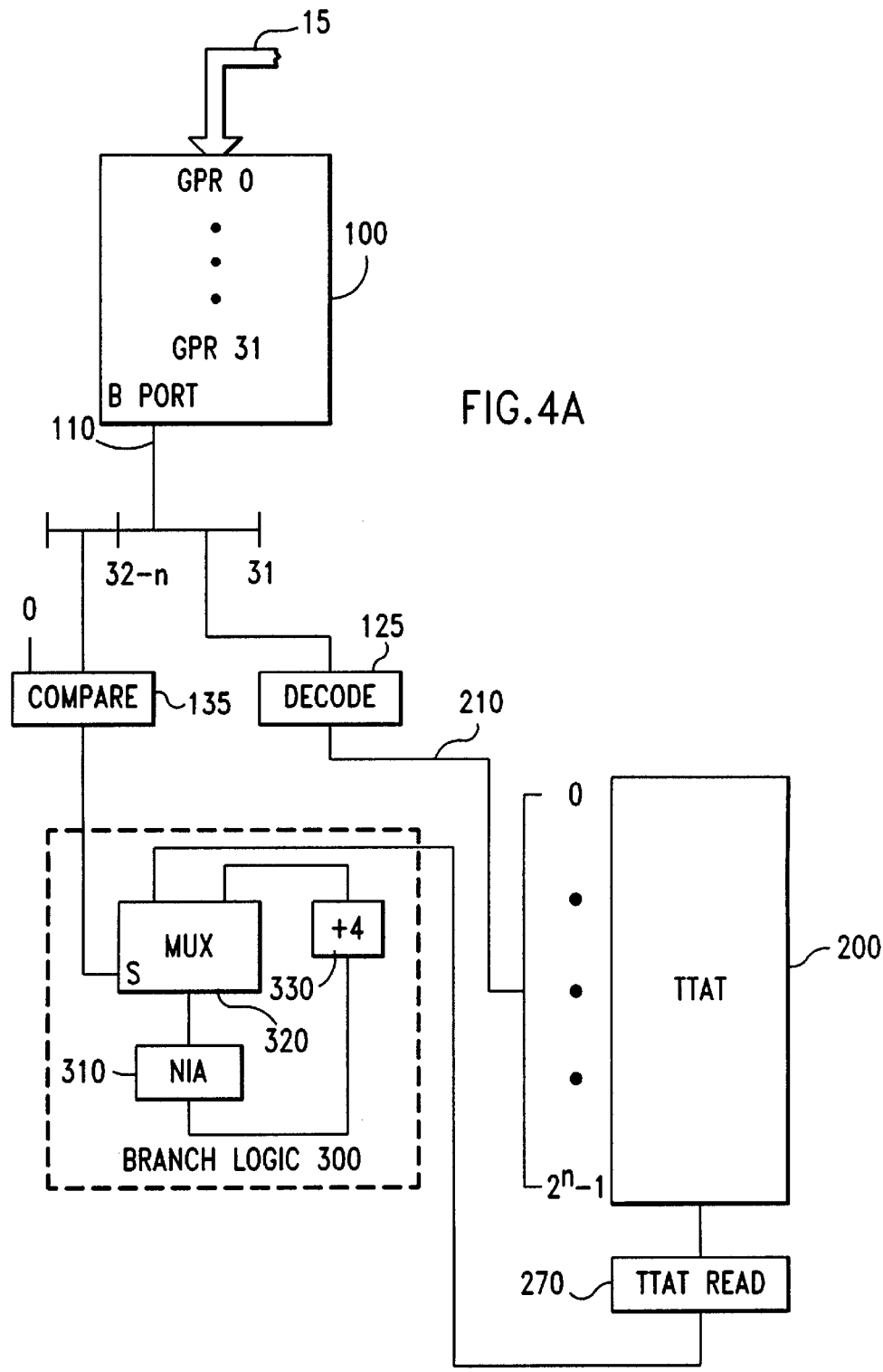
FIG. 4A illustrates the hardware resource which has been added to the general purpose computer or microprocessor for carrying out a read portion of the operation in accordance with the present invention wherein the read portion of the operation exhibits a single statement multi-way branch.
Figure 4B:
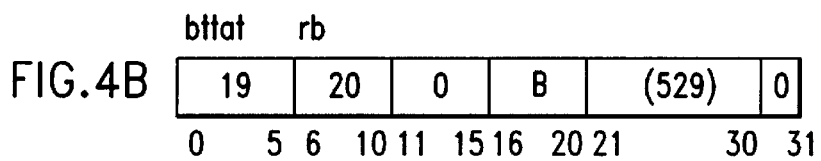
FIG. 4B is an example of an instruction which is added to the repertoire of the processor for the purpose of implementing a read portion of operation in accordance with the present invention.

Implementing the present invention requires the implementation of a new processor instruction, here referred to as bttat or Branch on Token-To-Address Table. The hardware needed to implement this instruction is a subset of that found in FIG. 5 and is shown in FIG. 4A. An exemplary form of the instruction is shown in FIG. 4B.

Figure 3A:
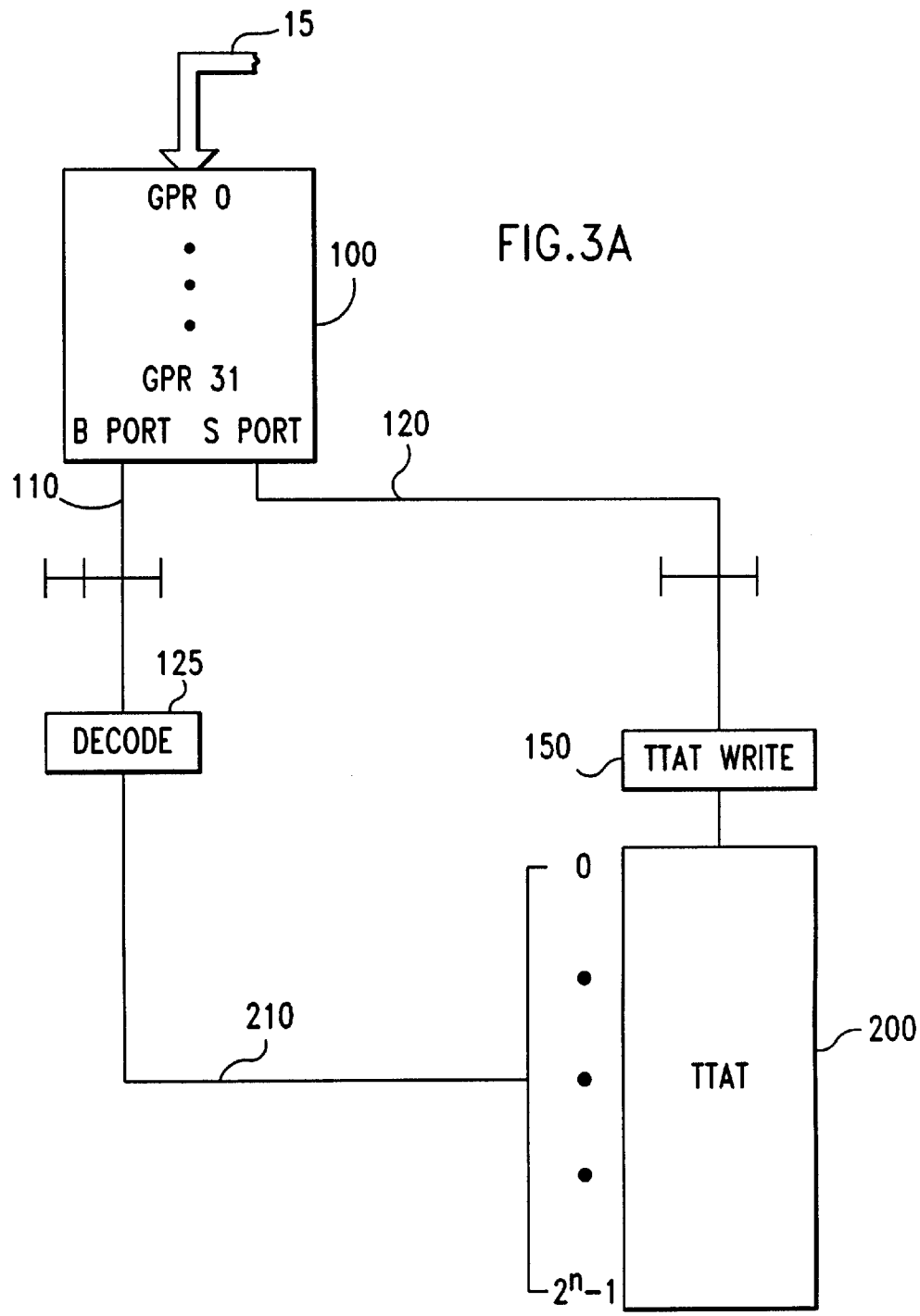
FIG. 3A shows portions of a hardware resource which are added to a general purpose computer system such as a microprocessor for carrying out a write portion of operation in accordance with the present invention.
Figure 3B:
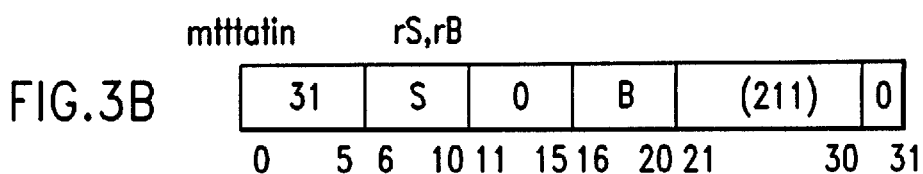
FIG. 3B is an exemplary instruction added to the processor repertoire for the purpose of implementing a write portion of operation in accordance with the present invention.

However, before it is possible to actually execute the instruction bttat, it is first necessary to load the table with appropriate data. An instruction to perform that function is referred to as mtttatin, or Move to Token-To-Address Table Indirect. The hardware needed to support this instruction is a subset of that found in FIG. 5 and is shown in FIG. 3A. An exemplary form of mtttatin is shown in FIG. 3B.

Referring to FIG. 3A, the mtttatin instruction is used to load the table 200. The instruction (see FIG. 3B) specifies a register (rS) containing a table entry and another register (rB) containing the table index for that entry. The format for the instruction is selected based on the similarity to the mtsrin instruction. The minor op code, 211, was chosen arbitrarily. Any of the many unused values for this field could be used in lieu of the value 211.

In the following portions of the specification reference is made to quantities contained in parenthesis, such as (rB). Whereas rB identifies a register, particularly register B, the indication (rB) refers to the contents of the register B.

Assuming that the general purpose registers 100 are loaded with a sequence of appropriate value, execution of the instruction mtttatin extracts (rB) via the B port and the interface 110 to the decode element 125. The output of the decode element 125, based on (rB) selects one of the multi-location registers in the TTAT. With this location selected, the quantity (rS), obtained from the S port via the interface 120 through the TTAT write register 150, is used to load that particular location. In this fashion, a plurality of the locations in the TTAT 200 are loaded. In particular, loading the register TTAT 200 establishes a relationship exemplified in the following Table 1.

TABLE 1

| Location Address | Location Content |
| --- | --- |
| $(rB_0)$ | $(rS_0)$ |
| $(rB_1)$ | $(rS_1)$ |
| ... | ... |
| $(rB_n)$ | $(rS_n)$ |

In particular, the relationship shown in Table 1 allows a target value, specifically one of the sequence $(S_0 \ldots S_n)$ to be extracted given an index, one of the sequence $B_0 \ldots B_n$.

As has been described the mtttatin instruction will transfer data from the general purpose register stack into the TTAT 200. In particular, target data will be loaded through the S port into the TTAT 200 at a location identified by the corresponding address read at the B port.

FIG. 4A shows the hardware used to implement the Branch on Token-To-Address Table (bttat) instruction. This instruction is designed with a form similar to the bclr instruction, again with an arbitrarily chosen minor op code that is currently unused (529). This instruction has a field to specify a GPR whose contents are used as the index for the multi-way branch. The table element at that index, also called the target, is read into the TTAT read register 270 which may then be used as the Next Instruction Address. The high-order bits of the register value, those not used to determine the index itself, must all be 0 in order for the branch to be taken. If not, the index value is out-of-range and the branch is not taken. The compare logic (see compare element 135) for the out-of-range determination and the multiplexer 320 are used to select either the contents of the table element or the next sequential address, as shown in FIG. 4A.

In particular, when the bttat instruction is issued, the index from register 0, one of the GPR registers 100, is transferred from the B port through the interface 110. The low order bits are coupled to the decode element 125 where they are used to address the TTAT 200 through its addressing input 210. A selected TTAT element, selected by the address, is transferred to the TTAT read register 270 and from there, to an input of the multiplexer 320. The other input to the multiplexer 320 is the output of the NIA register 310 incremented by the constant used in the incrementing device 330. Thus, the multiplexer 320 allows its output to be selected as either the address coupled from the TTAT read register 270 or the prior output of the multiplexer (taken from the NIA) incremented by the predetermined quantity identified in the incrementing circuit 330. The multiplexer 320 selects the one of its inputs determined by the input on its select terminal S. The input to the select terminal S is the output of the comparator 135. The comparator 135 compares the high order bits from the B port of the GPR 100 with the predetermined quantity 0. If the high order bits are 0 (meaning that the index is within range), then the select input to the multiplexer 320 is arranged so as to pass, to its output, the quantity received from the TTAT read register 270, and vice versa.

FIGS. 6A, 6B, 6C, 7, 8A, 8B and 9 show some of the software and register support which is helpful in a practical implementation employing the invention. This is especially true if the software is divided into an operating system which can be called on by many applications and one or plurality of applications residing in the computer which may initiate use of the mtttatin instruction. For one thing, a new flag in the Machine Status Register (MSR) is defined to indicate whether the TTAT is available for use. The TTAT available flag is thus analogous to a floating point available flag. FIG. 6B shows that particular flag in a typical MSR register.

At IPL, the system will establish a global serialization mechanism to handle software serialization for the facility. This is required for initialization as the initialization of the table will require many unserialized hardware operations in sequence to load the table. The system will also need to allocate space on a per execution basis to save and restore the contents of the TTAT during process switches. This save and restore area will have a validity indicator to denote whether or not the TTAT resource is used by the process. The operating system will also need a globally accessible field that contains the process ID of the process that currently owns the TTAT. FIG. 6A shows such a global TTAT status area storing the ID of the "owner" of the TTAT. FIG. 6C shows a plurality of per-process blocks such as blocks P1 and P2. Each block includes the ID for that process (PID) as well as an area set aside for TTAT data, denoted the TTAT save area. Both FIGS. 6A and 6C represent storage used by the support software.

In general, the TTAT will be uninitialized and the MSR flag will be off. Any application wishing to use the TTAT is required to build a table of virtual addresses to fill the TTAT and call the OS service Initialize TTAT. The Initialize TTAT service will obtain the system level serialization for the TTAT and begin to fill the TTAT with addresses passed in from the application program. The TTAT addresses will also be saved in the process specific TTAT save area (see FIG. 6C). The TTAT addresses are saved such that they may be restored from the process specific save area during process switches. The Initialize TTAT service will validate that the table is of correct size. Validation of the addresses does not need to be performed as a bad TTAT target will cause the same failure as a bad branch.

Once the TTAT has been initialized, the Initialize TTAT service will place the process ID of the caller into the global TTAT current process ID field (see FIG. 6A) to indicate that the TTAT is in use by the caller's process ID. The last action of the Initialize TTAT service is to turn on the MSR flag (see FIG. 6B) indicating that the TTAT resource is available for use. The application is returned to and branches on the TTAT may begin. FIG. 7 shows that IPL processing includes the function P3 "Establish Software TTAT Global Serialization".

Figure 8A:
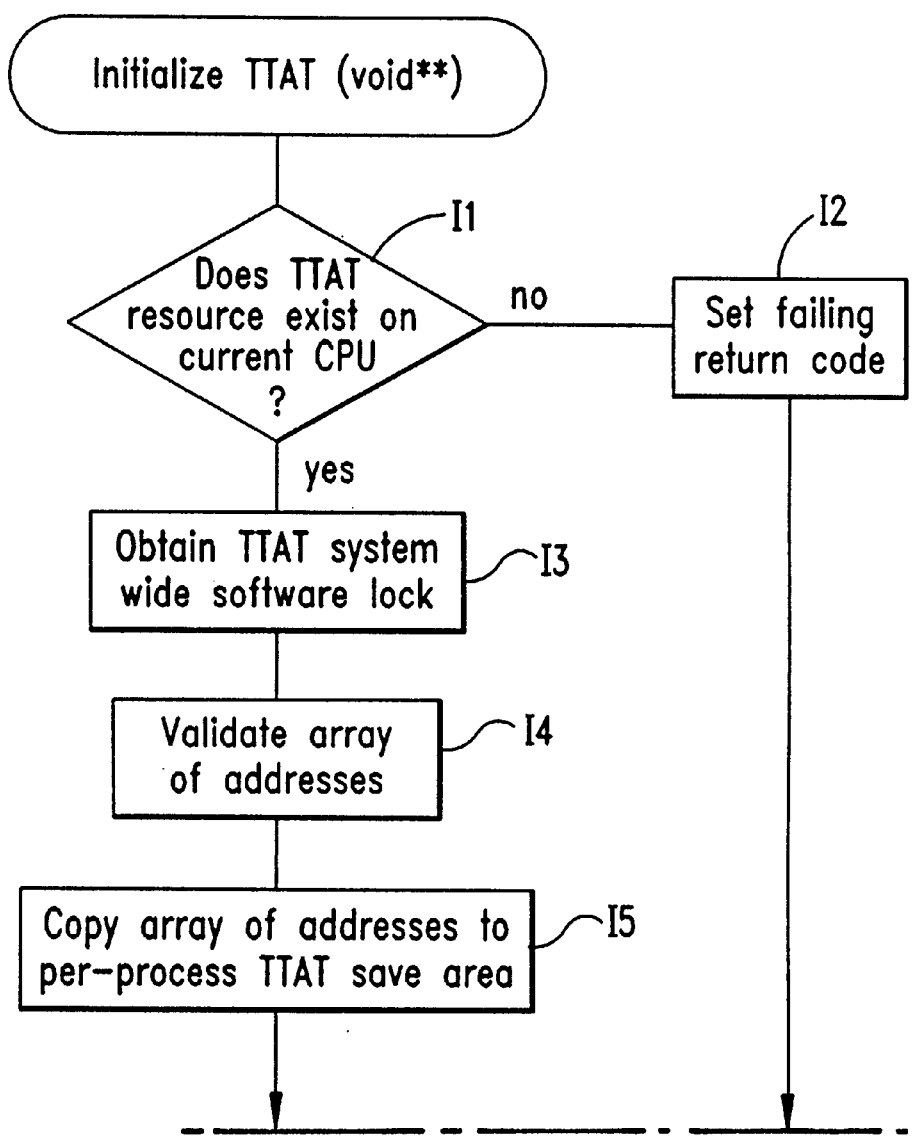
FIGS. 8A and 8B show an example of a TTAT initialization routine.
Figure 8B:
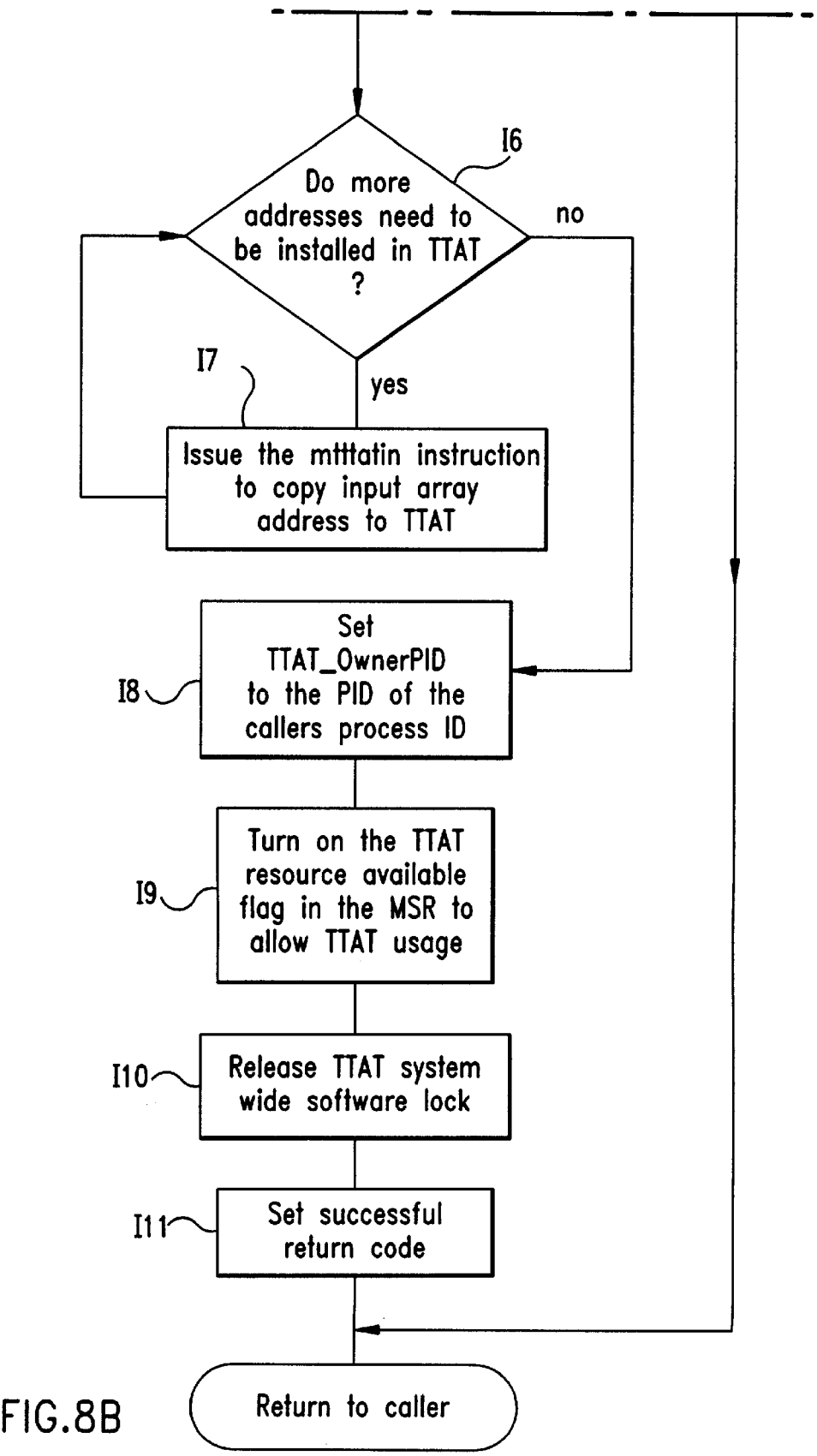
Figure 9:
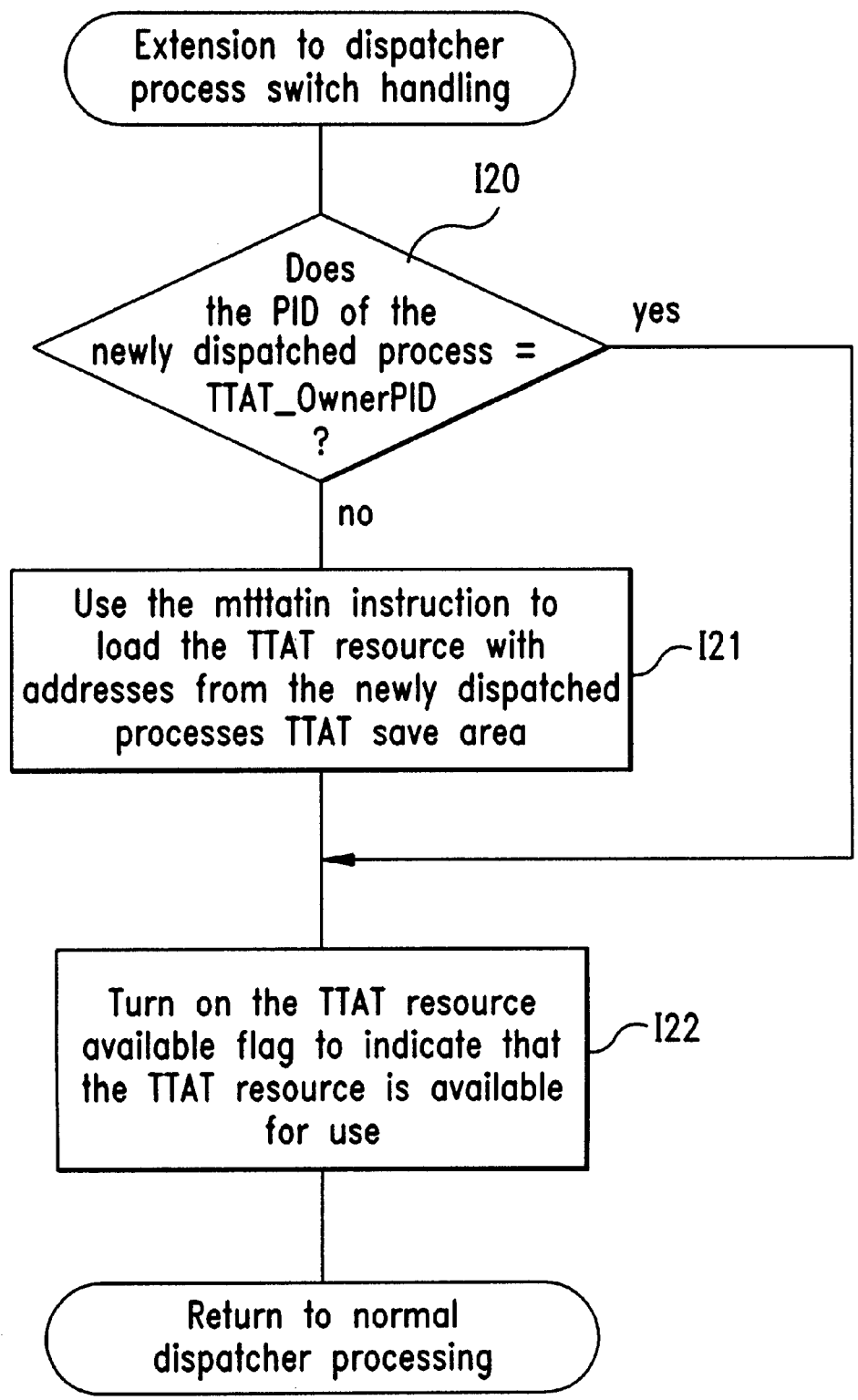
FIG. 9 shows an extension to a dispatch process to handle process switch handling in connection with support of the present invention.

FIGS. 8A and 8B show the TTAT initialization. Step I1 checks to see if the TTAT resource exists. If not, function I2 sets the failing return code and returns to the caller. On the other hand, if the TTAT resource does exist, then function I3 obtains a TTAT system-wide software lock. Step I4 validates the array of addresses against different criteria depending on system requirements and step I5 copies the array of addresses to the per-process TTAT save area (see FIG. 6C). Step I6 checks to see if more addresses need to be installed into the TTAT. If that is the case, step I7 issues the mtttatin instruction to copy addresses to the TTAT. When the TTAT no longer requires additional addresses, process flows to step I8 which sets the TTAT owner PID to the PID of the caller, i.e. this is the step which writes the status area of FIG. 6A. Step I9 then turns on the TTAT resource available flag in the MSR (FIG. 6B). Step I10 releases a TTAT system-wide software lock and step I11 sets a successful return code.

During a process switch, the dispatcher will determine whether the newly dispatched process ID matches the global TTAT current process ID. If the two process IDs match, it means that the newly dispatched task is the owner of the TTAT. In this case, the MSR flag indicating that the TTAT resource is available is turned on to allow the TTAT operations. In the case the TTAT is not owned by the newly dispatched process ID, the mtttatin instruction is used to load the TTAT with data from the TTAT save area. This is shown in flow diagram form in FIG. 9. Essentially function I20 compares the process ID of the newly dispatched process to that of the TTAT owner PID. If there is a match, function I22 is performed to turn on the TTAT resource available flag. If there is not a match, first step I21 is performed to load the TTAT and then I22 is performed.

Referring briefly to FIGS. 2B and 4A, operation of the invention should be apparent. Referring for example to FIG. 4A, once the mtttatin operation is complete, the TTAT 200 is loaded with the branch target data which is necessary to execute the multi-way branch instruction. At that point, the application can respond to a sequence such as that shown in FIG. 2B, in accordance with the present invention. The first step, a load step, loads the register 0 with a token or index corresponding to the case statement variable x. The next step is the single step which implements the multi-way branch instruction, i.e. it branches on that value found in the particular location of the TTAT which corresponds to the index or token which exists in register 0. By now it should be apparent that this merely requires accessing the TTAT 200 so that the contents of the selected location are read into the TTAT read register 270 and from there flow through the multiplexer 320 into the NIA register 310 from which the address is available for the processor to continue processing.

Comparing FIGS. 2A and 2B, the advantage obtained by the invention should be apparent. In particular, the multi-way branch operation of FIG. 2B requires but a single step (once the token or index is loaded in the register) whereas in the prior art example of FIG. 2A, three preparatory steps are required before the branch itself.

While the foregoing has described a particular example of the invention, it should be apparent that many changes can be made within the spirit and scope of the invention. While the advantage to employing the invention in branching to subroutines for handling Java instructions has been mentioned, the invention is not at all confined to this particular application. Rather, as has been mentioned, applications of the invention also include parsing operations such as word processor or network switching as well as simulators such as Apple's highly used 68000 emulator with a Power PC. Accordingly, the invention is not to be limited by the foregoing specification, but rather is to be defined by the claims appended hereto.

What is claimed is:

1. A method for efficiently operating a computer system including supporting at least one multi-way branch instruction comprising the steps of:

a) providing a computer system with a hardware token-to-address table (TTAT), b) providing software for execution with at least one multi-way branch instruction, c) loading the TTAT with branch target data correlating to the multi-way branch instruction data prior to the execution of said multi-way branch instruction, and d) executing the software including accessing the TTAT to execute the multi-way branch instruction by applying an index associated with said multi-way branch instruction to said TTAT to branch to a corresponding target address.

2. A method as recited in claim 1 wherein the step b) includes:

b1) providing the computer system with an operating system), and b2) providing an application with at least one multi-way branch instruction.

3. A method as recited in claim 2 in which the step c) comprises executing a unique instruction for the loading of the TTAT using resources of the operating system and triggered into operation by initiation of the application.

4. A method as recited in claim 2 wherein the step b2) includes executing a unique instruction of the application for accessing the TTAT with an index to extract one of the branch target data comprising an address to implement the multi-way branch.

5. A method as recited in claim 1 wherein:

the step b) includes providing the computer system with an operating system, and providing an application with at least one multi-way branch instruction, the step c) comprises executing a unique instruction for the loading of the TTAT using resources of the operating system and triggered into operation by initiation of the application, and the step d) includes executing a unique instruction of the application for accessing the TTAT with an index to extract one of the branch target data comprising an address to implement the multi-way branch.

6. A method as recited in any of claims 1–5 in which at least a portion of the software is written in Java.

7. A program product for efficiently providing multi-way branches comprising:

a computer usable medium having computer readable program code means embodied in said medium including at least one multi-way branch statement, said program code means including a single statement implementing a multi-way branch by using an index associated with said statement to address a multi-location table external to said program code means, said multi-location table storing branch target addresses.

8. The product of claim 7 wherein the program code means addresses a multi-location hardware register.

9. The program product of claim 7 or 8 which further includes:

additional program code means for loading said multi-location table with branch target addresses in locations defined by an accompanying index.

10. The program product of claim 7 wherein the multi-way branches are provided in an interpreted language.

11. The program product of claim 10 wherein the interpreted language is Java.

12. The program product of claim 11 wherein the at least one index correlates with a particular Java instruction and the associated branch target address is a location of the subroutine for execution of that Java instruction.

13. In combination, a computer system having branch logic and a general purpose register stack with a multi-ported output interface, and a hardware resource for implementing efficient multi-way branch operations associated with a multi-way branch instruction, said hardware resource comprising:

addressable storage comprising a plurality of multi-byte locations, said addressable storage having a write data input and a read data output and comprising index and corresponding target address data, a decoder connected between one port of the general purpose register interface and said addressable storage, said decoder having an output for selecting one of the multi-byte locations for an input/output operation, means coupling the write data input of the addressable storage to another port of the general purpose register interface, means coupling said read data output of the addressable storage to the branch logic, whereby data may be written from a port of the general purpose registers to a location in the addressable storage determined by an associated index obtained from another port of the general purpose registers, and whereby data comprising a target address corresponding to said index, said index being associated with said multi-way branch instruction, may be selected for output from the addressable storage to the branch logic by applying said index from a port of the general purpose registers to effect a data read operation.

14. The computer system of claim 13 in which said branch logic includes:

a multiplexer with two inputs and an output, one input of the multiplexer connected to the read data output a next instruction register with an input connected to the output of the multiplexer, the other input of the multiplexer responsive to an output of the next instruction register.

15. The computer system of claim 14 in which the multiplexer has a select input, and which further comprises a comparator with an input coupled to one port of the general purpose interface and an output connected to the select input of the multiplexer.

* * * * *